*US009197923B2*

US009197923B2

(12) United States Patent
Panje

(10) Patent No.: US 9,197,923 B2
(45) Date of Patent: *Nov. 24, 2015

(54) SYSTEM AND METHOD FOR SYNCHING PORTABLE MEDIA PLAYER CONTENT WITH STORAGE SPACE OPTIMIZATION

(71) Applicant: Google Technology Holdings LLC, Mountain View, CA (US)

(72) Inventor: Krishna Prasad Panje, Bangalore (IN)

(73) Assignee: Google Technology Holdings LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/570,511

(22) Filed: Dec. 15, 2014

(65) Prior Publication Data
US 2015/0100992 A1 Apr. 9, 2015

Related U.S. Application Data

(63) Continuation of application No. 12/847,035, filed on Jul. 30, 2010, now Pat. No. 8,914,603.

(51) Int. Cl.
*G06F 12/00* (2006.01)
*H04N 21/43* (2011.01)
(Continued)

(52) U.S. Cl.
CPC .............. *H04N 21/4302* (2013.01); *G06F 3/00* (2013.01); *H04L 67/20* (2013.01); *H04N 1/21* (2013.01);
(Continued)

(58) Field of Classification Search
CPC ......... G06F 12/121; G06F 3/005; G06F 3/00; H04N 21/4335; H04N 21/4126; H04L 67/20

USPC ....... 711/170, 156, 167, E12.001; 725/89, 80
See application file for complete search history.

(56) References Cited

U.S. PATENT DOCUMENTS 5,892,535 A * 4/1999 Allen et al. ................ 725/36
7,209,638 B1  4/2007 Novak et al.
(Continued)

FOREIGN PATENT DOCUMENTS

WO WO03036541 10/2003

OTHER PUBLICATIONS

Jia-Bao Cheng et al, "An Image Compression Scheme For Digital Video Cassette Recording", Computer and Communication Research Laboratories, IEEE Transactions on Computers, 1994, pp. 26-27.*

(Continued)

*Primary Examiner* — Pierre-Michael Bataille
(74) *Attorney, Agent, or Firm* — Byrne Poh LLP

(57) ABSTRACT

A device is provided for use with a content provider that is operable to provide content, which includes a plurality of content components. The device includes a communication portion, a memory portion, a parsing portion, a counting portion and a processing portion. The communication portion can receive the content from the content provider. The parsing portion can parse the content into the plurality of content components and can store the parsed plurality of content components within the memory portion. The counting portion can provide a counter for each of the parsed plurality of content components within the memory portion, respectively. The processing portion can retrieve and process one of the parsed plurality of content components within the memory portion. The counting portion can further increment the counter associated with the retrieved one of the parsed plurality of content components within the memory portion.

24 Claims, 5 Drawing Sheets

(51) Int. Cl.
*H04N 1/21* (2006.01)
*H04L 29/08* (2006.01)
*H04N 21/41* (2011.01)
*H04N 21/414* (2011.01)
*H04N 21/4335* (2011.01)
*H04N 21/442* (2011.01)
*H04N 21/435* (2011.01)
*H04N 21/439* (2011.01)
*H04N 21/44* (2011.01)
*G06F 12/12* (2006.01)
*G06F 3/00* (2006.01)

(52) U.S. Cl.
CPC ..... *H04N 21/4126* (2013.01); *H04N 21/41407* (2013.01); *H04N 21/435* (2013.01); *H04N 21/439* (2013.01); *H04N 21/4335* (2013.01); *H04N 21/44* (2013.01); *H04N 21/44222* (2013.01); *G06F 3/005* (2013.01); *G06F 12/121* (2013.01)

(56) References Cited

U.S. PATENT DOCUMENTS

| | | | |
|---|---|---|---|
| 7,228,350 B2 | 6/2007 | Hong et al. | |
| 7,418,568 B2 | 8/2008 | Maly | |
| 7,425,810 B2 | 9/2008 | Hobbet et al. | |
| 7,623,468 B2 | 11/2009 | Panigraphy et al. | |
| 8,155,506 B2 | 4/2012 | Mamidwar et al. | |
| 8,160,963 B2* | 4/2012 | Risan et al. | 705/57 |
| 8,352,689 B2 | 1/2013 | Noeldner et al. | |
| 8,644,675 B2* | 2/2014 | McDermott et al. | 386/247 |
| 8,750,843 B2* | 6/2014 | Forrester et al. | 455/414.1 |
| 2003/0014483 A1 | 1/2003 | Stevenson et al. | |
| 2004/0078216 A1 | 4/2004 | Toto | |
| 2004/0128285 A1 | 7/2004 | Green et al. | |
| 2006/0053082 A1 | 3/2006 | Booth | |
| 2006/0155726 A1 | 7/2006 | Krasun et al. | |
| 2007/0168540 A1 | 7/2007 | Hansson | |
| 2008/0086603 A1 | 4/2008 | Lahtinen et al. | |
| 2008/0239801 A1 | 10/2008 | Throp et al. | |
| 2011/0138417 A1* | 6/2011 | Klappert | 725/40 |

OTHER PUBLICATIONS

General Instrument Corporation Videocipher Division, "Digicipher HDTV System Description", Document No. 62004, Jun. 22, 1990.*
Lee, et al., "SAVE: A Framework for Semantic Annotation of Visual Events", Technical Report, Dpet. of Statistic and Computer Science, University of California, Jun. 2008, pp. 1-8.
Office Action dated Nov. 6, 2013 in U.S. Appl. No. 12/847,035.
Office Action dated Apr. 22, 2014 in U.S. Appl. No. 12/847,035.
Office Action dated May 24, 2013 in U.S. Appl. No. 12/847,035.
Office Action dated Aug. 11, 2014 in U.S. Appl. No. 12/847,035.

* cited by examiner

SYSTEM AND METHOD FOR SYNCHING PORTABLE MEDIA PLAYER CONTENT WITH STORAGE SPACE OPTIMIZATION

CROSS-REFERENCE TO RELATED APPLICATION

This application is a continuation of a U.S. patent application Ser. No. 12/847,035, filed Jul. 30, 2010, which is hereby incorporated by reference herein in its entirety.

BACKGROUND

With the advent of Digital TV (DTV), the Digital Video Recorder (DVR) and media delivery systems like Internet Protocol TV (IP-TV), and video-on-demand (VOD); viewing content has become very flexible. A user may record a show and watch it later at his convenience. Current DVRs come with large enough storage to store several hours of content.

However, users want to be able to enjoy media content on the move. Portable Media Player (PMP) support for consumer premises equipment (CPE) like DVRs and digital set-top-boxes (STB) allows for mobile viewing of media content. With this feature, users can connect a PMP to a CPE and can choose the content to be transferred to the PMP to be viewed at later instance. Transferring content from a CPE to a PMP may include determining specific viewing or copying rights, authenticating such rights, encrypting/decrypting the content and so on. Such transferring may be referred to as synchronizing or syncing. In use, a user will select content to be transferred to the PMP and the CPE will sync the entire transport stream (TS) associated with that content. The user may then select the content to be displayed on the PMP.

FIG. 1 illustrates an example conventional content distribution system capable of delivering media content from a service provider to an end user.

As illustrated in the figure, content distribution system 100 includes a content distributor 102, a service provider 104, a third party portal 106 and a user premises 108. User premises 108 includes CPE 110 and a PMP 112.

Content distributor 102 is capable of transmitting media content to service provider 104 by way of a signal 114. Third party portal 106 is capable of transmitting media content to service provider 104 by way of a signal 116. Service provider 104 is capable of transmitting media content to CPE 110 of user premises 108 by way of a signal 118. CPE 110 is capable of transmitting media content to PMP 112 by way of a signal 120.

In operation, service provider 104 receives media content by way of signal 114 from content distributor 102 or by way of signal 116 from third party portal 106. Service provider then transmits the media content to CPE 110 by way of signal 118. A user may also decide to transfer media content to PMP 112 by way of signal 120. Some types of media content require a large amount of memory for storage on either CPE 110 or PMP 112, requiring a user to frequently manage the media content stored on PMP 112.

Several problems associated with this method of content transfer from CPE to PMP will now be described.

If The PMP memory (not shown) becomes full the user is then prompted to delete old or specified content. It would be advantageous if the deletion were done automatically. With the advent of huge content repository and management systems the content is becoming more data intensive. It is not only the format of the content (like space hogging HD video) but also content that may have a plurality of associated information, non-limiting examples of which include different language audio, subtitles, camera angle, director's cut/special, commentary and alternative targeted content.

A user may ask to sync a content to PMP when the PMP may not have space to copy the new content. The user must then browse through the PMP interface and specify distinct portions of content for deletion, one by one. This process may be time consuming and aggravating as the PMP user interface is small and it may be difficult for the user to search through the memory of the PMP.

A user may schedule recordings to record content from an CPE to a PMP. If the scheduled recording requires more memory than available on the PMP, then recording may fail.

When a DVR records a program, the DVR may record the entire transport stream (TS) associated with that program. Different components in the TS are identified with different program identification numbers (PIDs). When a user uses the DVR for playback, specific components of the TS can be presented to the user based on user choice, non-limiting examples of which include audio language and camera angle. The disadvantage of recording the entire TS is that the recording uses a large amount of memory. If the recording is transferred to a PMP, a large amount of PMP memory will be used to store the recording even if there are components of the recording that may never be used on the PMP.

What is needed is a system and method for managing media content on a PMP based on user tendencies.

BRIEF SUMMARY

The present invention provides a system and method for managing media content on a PMP based on user tendencies.

In accordance with an aspect of the present invention, a device is provided for use by a content provider that is operable to provide content, which includes a plurality of content components. The device includes a communication portion, a memory portion, a parsing portion, a counting portion and a processing portion. The communication portion can receive the content from the content provider. The parsing portion can parse the content into the plurality of content components and can store the parsed plurality of content components within the memory portion. The counting portion can provide a counter for each of the parsed plurality of content components within the memory portion, respectively. The processing portion can retrieve and process one of the parsed plurality of content components within the memory portion. The counting portion can further increment the counter associated with the retrieved one of the parsed plurality of content components within the memory portion.

Additional advantages and novel features of the invention are set forth in part in the description which follows, and in part will become apparent to those skilled in the art upon examination of the following or may be learned by practice of the invention. The advantages of the invention may be realized and attained by means of the instrumentalities and combinations particularly pointed out in the appended claims.

BRIEF SUMMARY OF THE DRAWINGS

The accompanying drawings, which are incorporated in and form a part of the specification, illustrate an exemplary embodiment of the present invention and, together with the description, serve to explain the principles of the invention. In the drawings.

DETAILED DESCRIPTION

Figure 1:
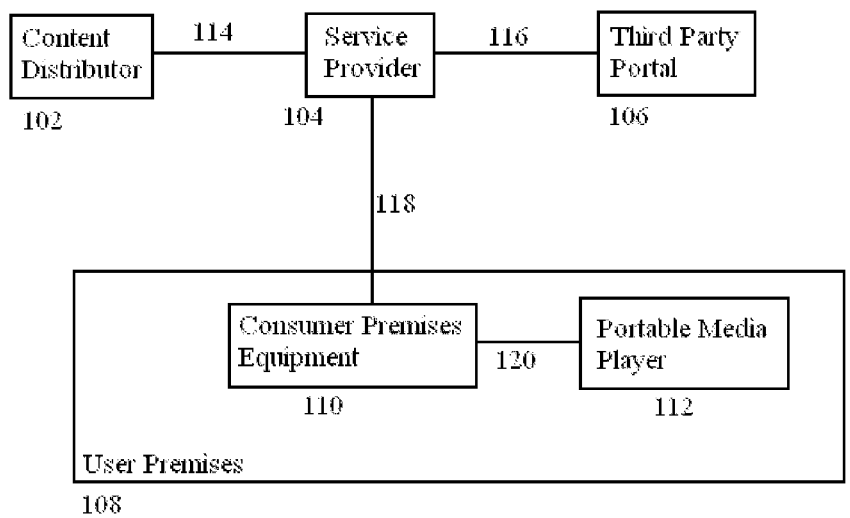
FIG. 1 illustrates an example content distribution system.

In one embodiment of the present invention, a user may view media content on a PMP or consumer premises equipment (CPE). The media content may be divided into separate components identified by program identification numbers (PIDs) including but not limited to different video components, different audio components, and data components as in Table 1.

TABLE 1

| Program ID | Program->PID ID | Component explanation |
|---|---|---|
| 0x1234 | 0x0001 | Main video |
|  | 0x0002 | Main Audio |
|  | 0x0003 | Spanish audio |
|  | 0x0004 | Subtitle |
|  | 0x0005 | Scene description metadata |
|  | 0x0006 | Targeted video 1 |
|  | 0x0007 | Targeted audio 1 |
|  | 0x0008 | Camera close up video1 |
|  | 0x0009 | Camera close up video2 |

The "Program ID" column in Table 1 indicates with which program the content is associated. In this example, there is only a single program identified at 0x1234. The "Program->PID ID" column in Table 1 indicates the program identifiers for each component of content within the program. The "Component explanation" column in Table 1 provides an explanation of each component within the program. In this example, the program has nine distinct components: a main video, a main audio, a Spanish audio, a subtitle, a scene description metadata, a targeted video 1, a targeted audio 1, a camera close up video 1 and a camera close up video 2.

When the media content is played back, not all of the PIDs are used at once. For example, a user may decide to play media content on a PMP. The user may decide to watch the main video component (0x0001) with the main audio component (0x0002) and subtitles (0x0004). In this instance, only the components the user needs to watch are required for playback.

In one embodiment of the present invention, a PMP or CPE that is used for playback of media content will associate a play count with the components of the media content that is played on the device. In one example, a user may playback content on a PMP as above. The PMP will then examine the play count of the components of the media content and increment the components that are viewed and decrement the components that are not viewed. In this example, the user views components with PIDs 0x0001, 0x0002 and 0x0004 but not the other components. In this example, the user is viewing this content for the first time and the play counts of all components are 0. In this example, once the user views the media content, the PMP increments components with PIDs 0x0001, 0x0002 and 0x0004 and decrements the components with PIDs 0x0003, 0x0005, 0x0006, 0x0007, 0x0008 and 0x0009. In other examples, the PMP may alternatively increments components that are played, but not decrement components that are not played.

Over time, a user will view content several times and may choose to view different components each time the content is viewed. For purposes of explanation, presume that after a time period, the user will have viewed the content several times such that play counts associated with the components of the media content are as shown in Table 2.

TABLE 2

| Program ID | Program->PID ID | Program->PID Playcount | Component explanation |
|---|---|---|---|
| 0x1234 | 0x0001 | 6 | Main video |
|  | 0x0002 | 6 | Main Audio |
|  | 0x0003 | −6 | Spanish audio |
|  | 0x0004 | 6 | Subtitle |
|  | 0x0005 | −6 | Scene description metadata |
|  | 0x0006 | −5 | Targeted video 1 |
|  | 0x0007 | −5 | Targeted audio 1 |
|  | 0x0008 | −3 | Camera close up video1 |
|  | 0x0009 | −3 | Camera close up video2 |

Table 2 is similar to Table 1, but further includes a "Program->PID Playcount" column that indicates a playcount for each component of content within the program. For example, in some embodiments, every time a component of content within the program is played, is it incremented by a predetermined amount. In some embodiments, every time a component of content within the program is played all other components of content within the program that are not played are decremented by a predetermined amount. For purposes of explanation, in this example: the Main video, the Main audio and the subtitle components are played the most, thus receiving a playcount of 6; whereas the Spanish audio and the Scene description metadata components are played the lest, thus receiving a playcount of −6.

In one embodiment of the present invention, the PMP is operable to manage its memory based on usage of media content on the PMP. The PMP may examine the play counts associated with components of media content to determine components that can be removed. In one example, a user may decide to synchronize content between a PMP and a CPE. If more memory is needed for synchronization between the PMP and a CPE, the PMP may remove some components of the content. In some embodiments, the PMP may remove the least used components of the content, i.e., the components having the lowest play count, on the device. In some embodiments, the PMP may remove components of the content that are not played a predetermined number of times, i.e., the components having a play count below a predetermined threshold, on the device.

In this example, media content on the PMP is separated into components with play counts as in Table 2. When the PMP needs more memory when synchronizing, the PMP will examine the play counts in the media content. The PMP will then remove the components with the lowest play counts, in this example, components with PIDs 0x0003 and 0x0005 will be removed first. If this removal results in enough available memory for the synchronization process, the PMP and CPE synchronize. If there is not enough available memory, the PMP may again remove the components of the media content with the lowest play count. In this example, the next components to be removed would be the components with PIDs 0x0006 and 0x0007.

An example system and method for efficiently synchronizing content between CPE and a PMP in accordance with as aspect of the present invention will be described with reference to FIG. 2-7.

Figure 2:
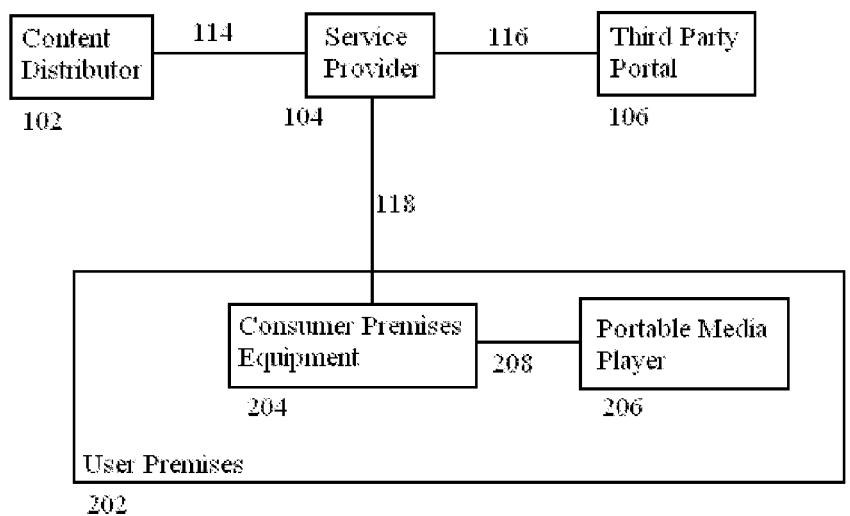
FIG. 2 illustrates an example content distribution system in accordance with an aspect of the present invention.

FIG. 2 illustrates an example content distribution system 200, in accordance with an aspect of the present invention, which is capable of delivering media content from a service provider to an end user.

As illustrated in FIG. 2, content distribution system 200 includes content distributor 102, service provider 104, third party portal 106 and user premises 202. User premises 202 includes CPE 204 and PMP 206.

Content distributor 102 is capable of transmitting media content to service provider 104 by way of signal 114. Third party portal 106 is capable of transmitting media content to service provider 104 by way of signal 116. Service provider 104 is capable of transmitting media content to CPE 204 of user premises 202 by way of signal 118. CPE 204 is capable of transmitting media content to PMP 206 by way of a signal 208.

Signals 114, 116, 118 and 208 may be wired or wireless signals. Although, each of signals 114, 116, 118 and 208 are illustrated as distinct signals, they all may share a predetermined frequency band within a wireless medium. Signals typically embody computer-readable instructions, data structures, program modules, or other data in a modulated data signal such as a carrier wave or other transport mechanism and include any information-delivery media. Non-limiting examples of communications media, which may carry signals, include wired media, such as wired networks and direct-wired connections, and wireless media such as acoustic, radio, infrared, and other wireless media. The term "computer-readable media" as used herein includes both storage media and communications media.

In operation, service provider 104 receives media content by way of signal 114 from content distributor 102 or by way of signal 116 from third party portal 106. Service provider then transmits the media content to CPE 204 by way of signal 118. A user may also decide to transfer media content to PMP 206 by way of signal 208. In accordance with an aspect of the present invention, media content synchronized between CPE 204 and PMP 206 may be reduced in size to allow for faster synchronization or smaller memory required for storage.

Figure 3:
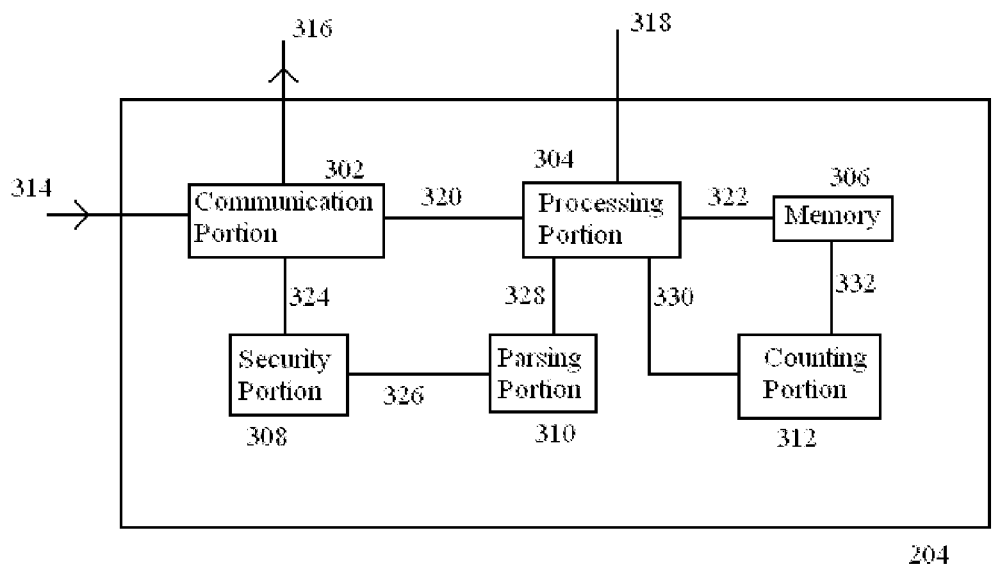
FIG. 3 illustrates an example CPE.

FIG. 3 illustrates a detailed view of an example CPE 204 in accordance with an aspect of the present invention.

As illustrated in FIG. 3, CPE 204 includes a communication portion 302, a processing portion 304, a memory 306, a security portion 308, a parsing portion 310 and a counting portion 312. In this example, each of communication portion 302, processing portion 304, memory 306, security portion 308, parsing portion 310 and counting portion 312 are distinct devices. However, in other embodiments, at least two of communication portion 302, processing portion 304, memory 306, security portion 308, parsing portion 310 and counting portion 312 may be combined as a unitary device. Further, in some embodiments at least one of communication portion 302, processing portion 304, memory 306, security portion 308, parsing portion 310 and counting portion 312 may be implemented as computer-readable media for carrying or having computer-executable instructions or data structures stored thereon. Such computer-readable media can be any available media that can be accessed by a general purpose or special purpose computer. Non-limiting examples of computer-readable media include physical storage and/or memory media such as RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Communication portion 302 is capable of receiving input by way of a signal 314 and capable of transmitting output by way of a signal 316. Additionally, communication portion 302 is capable of exchanging data with security portion 308 by way of a signal 324 and is capable of exchanging data with processing portion 304 by way of a signal 320. Processing portion 304 is capable of outputting to a display by way of a signal 318. Additionally, processing portion 304 is capable of communicating with memory 306 by way of a signal 322, is capable of communicating with parsing portion 310 by way of a signal 328 and is capable of communicating with counting portion 312 by way of a signal 330. Memory portion 306 is capable of communicating with counting portion 312 by way of a signal 332. Security portion 308 is capable of communicating with parsing portion 310 by way of a signal 326.

Signals 316, 318, 320, 322, 324, 326, 328, 330 and 332 may be wired or wireless signals. Although, each of signals 316, 318, 320, 322, 324, 326, 328, 330 and 332 are illustrated as distinct signals, they all may share a predetermined frequency band within a wireless medium. Signals typically embody computer-readable instructions, data structures, program modules, or other data in a modulated data signal such as a carrier wave or other transport mechanism and include any information-delivery media. Non-limiting examples of communications media, which may carry signals, include wired media, such as wired networks and direct-wired connections, and wireless media such as acoustic, radio, infrared, and other wireless media.

Communication portion 302 is used to communicate with external devices such as PMP 206 through known protocols, non-limiting examples of which include Wi-Fi and USB. Communication portion 302 may also communicate with external media sources such as service provider 104 through known protocols, non-limiting examples of which include cable, satellite, fiber-optic communication.

Processing portion 304 is used for control of communication portion 302, memory 306, parsing portion 310 and counting portion 312. Processing portion 304 is also capable of outputting video to a display by way of signal 318 in known formats, non-limiting examples of which include MPEG-1, MPEG-2 and MPEG-4.

Memory 306 is used for storage of media content and other information as required by CPE 204.

Security portion 308 is used manage the intellectual property rights (IPR) of the media content. Non-limiting examples of IPR may include restrictions on the number of times that media content may be played, restrictions on the number of times that media content may be copied or transferred, restrictions on devices that media content is allowed to be copied or transferred to, and restrictions on the length of time that media content can be used from when it was first downloaded or first viewed. Security portion 308 may manage the IPR of the media content through use of encryption keys.

Parsing portion 310 is used to separate media content transferred to CPE 204 into separate components. One example of the components of media content is discussed above with reference to Table 1. The media content has multiple video components, multiple audio components and other data. For example, parsing portion 310 can separate components of media content used for playback. A user may wish to view the main video component with the Spanish audio component. Parsing portion 310 separates the main video component and the Spanish audio component of the media content for playback.

Counting portion 312 is used to increment and decrement play counts associated with components of the media content used by CPE 204. In one embodiment of the present invention, when media content is played by CPE 204, counting portion may increment portions of media content that are played and decrement portions of media content that are not played as discussed in the example above.

In one embodiment of the present invention, CPE 204 is capable of receiving media content as input signal 314. Communication portion 302 receives input signal 314 and transmits the media content to security portion 308 by way of signal 324. Security portion 308 decrypts the media content and transmits the decrypted media content to parsing portion 310 by way of signal 326. Parsing portion 310 parses the decrypted media content and transmits the parsed media content to processing portion 304 by way of signal 328. Parsing portion 310 separates the media content into several pieces, non-limiting examples include video, audio and metadata. Processing portion 304 sends the parsed media content to be stored in memory 306 by way of signal 322.

When a user requests playback on CPE 204, processing portion 304 retrieves content from memory 306 by way of signal 322. Processing portion 304 then outputs the content to a display by way of signal 318. The media content being displayed may have more components than can be viewed at once, non-limiting examples of which include multiple video streams, multiple audio streams and multiple camera angles. In one embodiment of the present invention, the pieces of parsed media content are each associated with a counter. When the media content is played by CPE 204, the counters associated with portions of the content that are displayed are incremented while the counters associated with portions of the content that are not displayed are decremented. In this embodiment, processing portion 304 signals counting portion 312 to increment or decrement the counters associated with specific portions of media content by way of signal 330. Counting portion 312 then increments or decrements the counters associated with the media content in memory 306 by way of signal 332.

Additionally, processing portion 304 may request media content from memory 306 by way of signal 322 for output to another device. Processing portion 304 then outputs the media content to communication portion 302 by way of signal 320. Communication portion 302 outputs the media content by way of signal 316.

Figure 4:
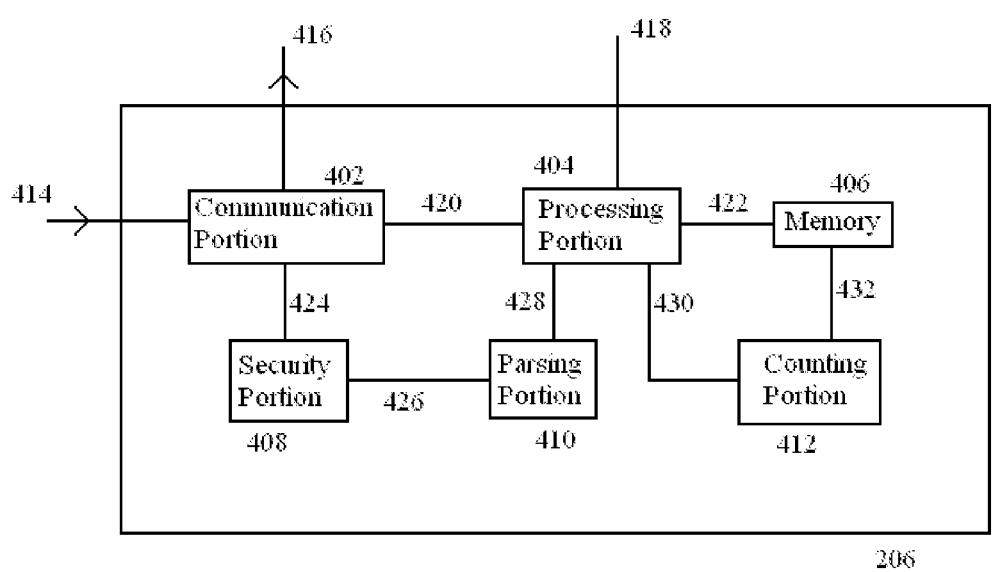
FIG. 4 illustrates an example PMP.

FIG. 4 illustrates a detailed view of PMP 206 in accordance with an aspect of the present invention.

As illustrated in FIG. 4, PMP 206 includes a communication portion 402, a processing portion 404, a memory 406, a security portion 408, a parsing portion 410 and a counting portion 412. In this example, each of communication portion 402, processing portion 404, memory 406, security portion 408, parsing portion 410 and counting portion 412 are distinct devices. However, in other embodiments, at least two of communication portion 402, processing portion 404, memory 406, security portion 408, parsing portion 410 and counting portion 412 may be combined as a unitary device. Further, in some embodiments at least one of communication portion 402, processing portion 404, memory 406, security portion 408, parsing portion 410 and counting portion 412 may be implemented as computer-readable media for carrying or having computer-executable instructions or data structures stored thereon.

Communication portion 402 is capable of receiving input by way of a signal 414 and capable of transmitting output by way of a signal 416. Additionally, communication portion 402 is capable of exchanging data with security portion 408 by way of a signal 424 and capable of exchanging data with processing portion 404 by way of a signal 420. Processing portion 404 is capable of outputting to a display (not shown) by way of a signal 418. Additionally, processing portion 404 is capable of communicating with memory 406 by way of a signal 422, is capable of communicating with parsing portion 410 by way of a signal 428, and is capable of communicating with counting portion 412 by way of a signal 430. Memory portion 406 is capable of communicating with counting portion 412 by way of a signal 432. Security portion 408 is capable of communicating with parsing portion 410 by way of a signal 426. Additionally, memory portion 406 of PMP 206 is smaller than memory portion 306 of CPE 204.

Signals 414, 416, 418, 420, 422, 424, 426, 428, 430 and 432 may be wired or wireless signals. Although, each of signals 414, 416, 418, 420, 422, 424, 426, 428, 430 and 432 are illustrated as distinct signals, they all may share a predetermined frequency band within a wireless medium. Signals typically embody computer-readable instructions, data structures, program modules, or other data in a modulated data signal such as a carrier wave or other transport mechanism and include any information-delivery media. Non-limiting examples of communications media, which may carry signals, include wired media, such as wired networks and direct-wired connections, and wireless media such as acoustic, radio, infrared, and other wireless media.

In one embodiment of the present invention, PMP 206 is capable of receiving media content as input signal 414. Communication portion 402 receives input signal 414 and transmits the media content to security portion 408 by way of signal 424. Security portion 408 decrypts the media content and transmits the decrypted media content to parsing portion 410 by way of signal 426. Parsing portion 410 parses the decrypted media content and transmits the parsed media content to processing portion 404 by way of signal 428. Parsing portion 410 separates the media content into several pieces, non-limiting examples of which include video, audio and metadata. Processing portion 404 sends the parsed media content to be stored in memory 406 by way of signal 422.

When a user requests playback on PMP 206, processing portion 404 retrieves content from memory 406 by way of signal 422. Processing portion 404 then outputs the content to a display by way of signal 418. The media content being displayed may have more components than can be viewed at once, non-limiting examples of which include multiple video streams, multiple audio streams and multiple camera angles. In one embodiment of the present invention, the pieces of parsed media content are each associated with a counter. When the media content is played by PMP 206, the counters associated with portions of the content that are displayed are incremented while the counters associated with portions of the content that are not displayed are decremented. In this embodiment, processing portion 404 signals counting portion 412 to increment or decrement the counters associated with specific portions of media content by way of signal 430. Counting portion 412 then increments or decrements the counters associated with the media content in memory 406 by way of signal 432.

Additionally, processing portion 404 may request media content from memory 406 by way of signal 422 for output to another device. Processing portion 404 then outputs the media content to communication portion 402 by way of signal 420. Communication portion 402 outputs the media content by way of signal 416.

Example methods of transfer of content between CPE 204 and PMP 206 will be described with reference to FIG. 5-7.

Figure 5:
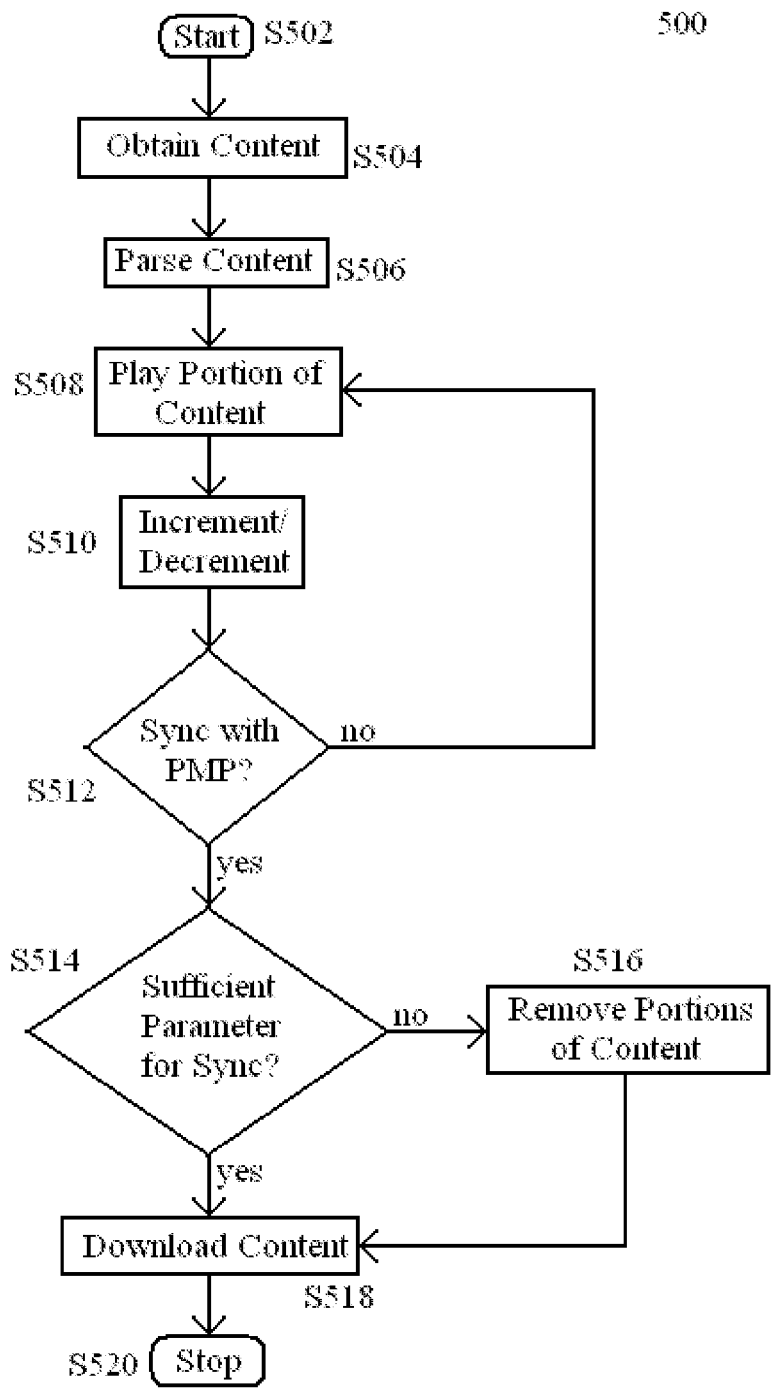
FIG. 5 illustrates an example method for a CPE to synchronize with a PMP in accordance with an aspect of the present invention.

FIG. 5 illustrates an example method 500 for CPE 204 to synchronize with PMP 206 in accordance with an aspect of the present invention.

To start (S502), CPE 204 obtains media content (S504) from service provider 104. In one embodiment, processing portion 304 instructs communication portion 302 to request content from service provider 104 by way of signal 316. Service provider 104 then provides the requested content by way of signal 314. In the event the provided content is encrypted, security portion 308 decrypts the content in accordance with the IP rights associated with the content as provided by service provider. The decrypted content is then provided to parsing portion 310.

The media content is then parsed into separate components (S506). For purposes of discussion, presume that CPE 204 downloads movie content corresponding to a movie titled "MOVIE." Further, for purposes of discussion, suppose MOVIE content includes a main video component, a main audio component, a Spanish audio component, a subtitle component, scene description metadata, a targeted video 1 component, a targeted audio 1 component, a camera close up video 1 component and a camera close up video 2 component, for example as discussed above with reference to Table 1. At this point, processing portion 304 instructs parsing portion 310 to separate MOVIE content into its components.

A user may then play portions of content on CPE 204 (S508). As mentioned above, a user may access components of MOVIE content for playback, for example on a TV (not shown).

The portions of the content are then incremented and/or decremented (S510). In one embodiment, counting portion 312 increments counters associated with the portions of the content that are played and decrements the counters associated with the portions of the content that are not played. In another embodiment, counting portion 312 increments counters associated with the portions of the content that are played and does not change the counters associated with the portions of the content that are not played.

It is then determined whether CPE 204 is to be synced with PMP 206 (S512). If content is not to be synced, then the person may continue to play portions of MOVIE content (S508).

If content is to be synced, it is then determine whether there are sufficient parameters for synchronization (S514). Non-limiting examples of synchronization parameters include time required for synchronization and memory available on PMP 206. For example, a user may be attempting to sync all the components of MOVIE content from CPE 204 to PMP 206. In this example, presume that PMP 206 indicates that synchronizing all the components of MOVIE will take 15 minutes and will require 12 gigabytes of storage within PMP 206. At that point, the user may determine that 15 minutes is too long a wait. Similarly, PMP 206 may provide an indication to user that memory portion 406 does not have 12 gigabytes of free storage with which it may download all the components of MOVIE.

If the parameters for synchronization are met, PMP 206 downloads the content from CPE 204 (S518). For example, suppose that PMP 206 indicates that synchronizing all the components of MOVIE will take 15 minutes and will require 12 gigabytes of storage within PMP 206. Further, suppose that the user does not mind waiting 15 minutes and that memory portion 406 of PMP 206 has 12 gigabytes of free storage with which it may download all of the components of MOVIE. In such a case, in one embodiment, processing portion 404 instructs communication portion 402 to request content from CPE 204 by way of signal 416. CPE 204 then provides the requested MOVIE content by way of signal 414. In the event the provided content is encrypted, security portion 408 decrypts the content in accordance with the IP rights associated with the content as provided by service provider. The decrypted content is then provided to parsing portion 410. At this point, processing portion 404 instructs parsing portion 410 to separate MOVIE content into its components.

The process then stops (S520) and the user may then view portions of content on PMP 206.

If the parameters for synchronization are not met, portions of MOVIE content are removed from the syncing process (S516). In an example embodiment, the counters associated with different components of MOVIE content are checked and the portions that have the lowest count are removed from the syncing process, e.g., they are not downloaded from CPE 204 to PMP 206. If not enough content has been removed, the portions with the next lowest counts are removed or deleted. The process of removing the portions of content with the lowest counts is repeated until the parameters for synchronization are met.

It is then again determined whether there are sufficient parameters for synchronization (S514).

Then, PMP 206 downloads the content from CPE 204 (S518) and the process finishes (S520).

The method described in FIG. 5 is drawn to synchronizing content from CPE 204 to PMP 206, wherein if memory 406 of PMP 206 has insufficient space to transfer all the content, some components of the content are not transferred from memory 306 of CPE 204. In another example method, unused portions of stored content within memory 406 of PMP 206 may be deleted to make room for downloading content from CPE 204. Such an example method will be described with reference to FIG. 6.

Figure 6:
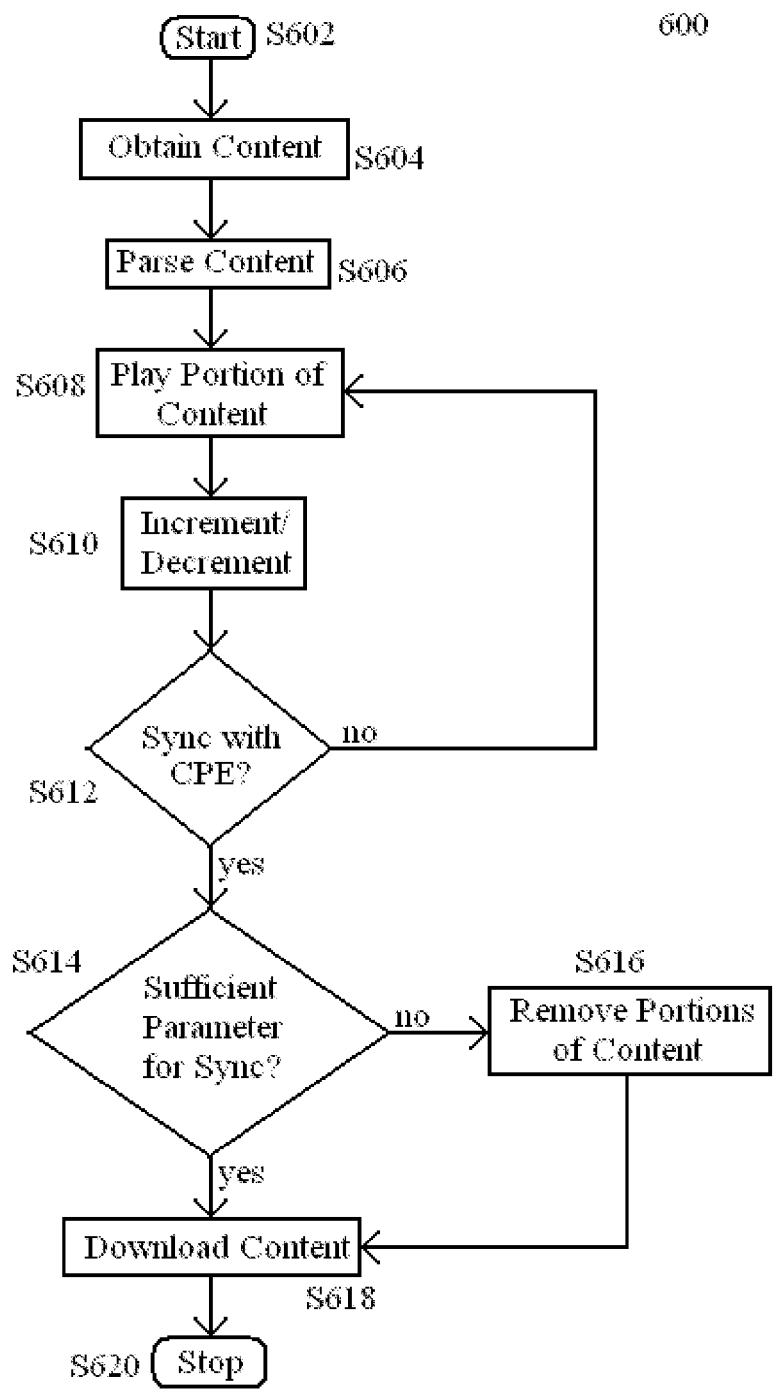
FIG. 6 illustrates an example method for a PMP to synchronize with a CPE in accordance with an aspect of the present invention.

FIG. 6 illustrates an example method 600 for PMP 206 to synchronize with CPE 204 in accordance with an aspect of the present invention.

Method 600 starts (S602) and PMP 204 obtains media content from CPE 204 (S604). In one embodiment, processing portion 404 instructs communication portion 402 to request content from CPE 204 by way of signal 416. CPE 204 then provides the requested content by way of signal 414. In the event the provided content is encrypted, security portion 408 decrypts the content in accordance with the IP rights associated with the content as provided by service provider. The decrypted content is then provided to parsing portion 410.

The media content is then parsed into separate components, in a manner similar to that described above with reference to step S506 of method 500 (S606). For purposes of discussion, presume that PMP 206 downloads movie content corresponding to a movie titled "MOVIE." Further, for purposes of discussion, suppose MOVIE content includes a main video component, a main audio component, a Spanish audio component, a subtitle component, scene description metadata, a targeted video 1 component, a targeted audio 1 component, a camera close up video 1 component and a camera close up video 2 component, for example as discussed above with reference to Table 1. At this point, processing portion 404 instructs parsing portion 410 to separate MOVIE content into its components.

A user may then play portions of content on PMP 206 (S608). As mentioned above, a user may access components of MOVIE content for playback, for example on a TV (not shown).

The portions of the content are then incremented and/or decremented in a manner similar to step S510 discussed above with reference to method 500 (S610). In one embodiment, counting portion 412 increments counters associated with the portions of the content that are played and decrements the counters associated with the portions of the content that are not played. In another embodiment, counting portion 412 increments counters associated with the portions of the content that are played and does not change the counters associated with the portions of the content that are not played.

It is then determined whether additional content is to be synchronized onto PMP 206 from CPE 204 (S612). For example, the user may want to copy second content.

If a user is not currently trying to synchronize content, then the person may be able to continue to play portions of the content currently on PMP 206 (S608).

If a user is attempting to synchronize content, it is then determined whether there are sufficient parameters for synchronization (S614). Non-limiting examples of synchronization parameters include time required for synchronization and memory available on PMP 206. For example, for purposes of discussion, presume that user want to synchronize, from CPE 204 onto PMP 206, another movie content corresponding to a movie titled "SECOND MOVIE." Further, for purposes of discussion, suppose SECOND MOVIE content includes a main video component, a main audio component, a Spanish audio component, a subtitle component, scene description metadata, a targeted video 1 component, a targeted audio 1 component, a camera close up video 1 component and a camera close up video 2 component, for example as discussed above with reference to Table 1. In this example, presume that PMP 206 indicates that synchronizing all the components of SECOND MOVIE will take 15 minutes and will require 12 gigabytes of storage within PMP 206. At that point, the user may determine that 15 minutes is too long a wait. Similarly, PMP 206 may provide an indication to user that memory portion 406 does not have 12 gigabytes of free storage with which it may download all the components of SECOND MOVIE.

If the parameters for synchronization are met, PMP 206 downloads the content from CPE 204 (S618). For example, suppose that PMP 206 indicates that synchronizing all the components of SECOND MOVIE will take 15 minutes and will require 12 gigabytes of storage within PMP 206. Further, suppose that the user does not mind waiting 15 minutes and that memory portion 406 of PMP 206 has 12 gigabytes of free storage with which it may download all of the components of SECOND MOVIE. In such a case, in one embodiment, processing portion 404 instructs communication portion 402 to request content from CPE 204 by way of signal 416. CPE 204 then provides the requested MOVIE content by way of signal 414. In the event the provided content is encrypted, security portion 408 decrypts the content in accordance with the IP rights associated with the content as provided by service provider. The decrypted content is then provided to parsing portion 410. At this point, processing portion 404 instructs parsing portion 410 to separate MOVIE content into its components.

If the parameters for synchronization are not met, components of the content currently residing in PMP are deleted (S616). In an example embodiment, the counters associated with different components of MOVIE content are checked and the components that have the lowest count are deleted from memory 406 of PMP 206. If not enough memory has been freed, the components of MOVIE CONTENT with the next lowest counts are deleted. The process of deleting the components of content with the lowest counts is repeated until the parameters for synchronization are met.

Then, PMP 206 downloads the content from CPE 204 (S618) and the process finishes (S620). In this example, the SECOND MOVIE content will be downloaded into PMP 206.

The example system and methods described above with reference to FIG. 6 manage media content between CPE 204 and PMP 206 by removing the least used content components within PMP 206 to free memory within PMP 206. This enables PMP 206 to download additional content that otherwise would not have fit within memory 406 of PMP 206.

Another example system and method in accordance with aspects of the present invention include a combination of the example method discussed above with reference to FIG. 5 and the example method discussed above with reference to FIG. 6. In particular, if the memory of a PMP has insufficient space to transfer all the desired content from a CPE, some components of the desired content may not transferred from the memory of the CPE and some of the components of content within the PMP may be deleted.

In another example method, PMP 206 uses user preferences developed viewing MOVIE CONTENT stored in memory 406 of PMP 206 to remove some components of additional movie content to be transferred from memory 306 of CPE 204. Such an example method will be described with reference to FIG. 7.

Figure 7:
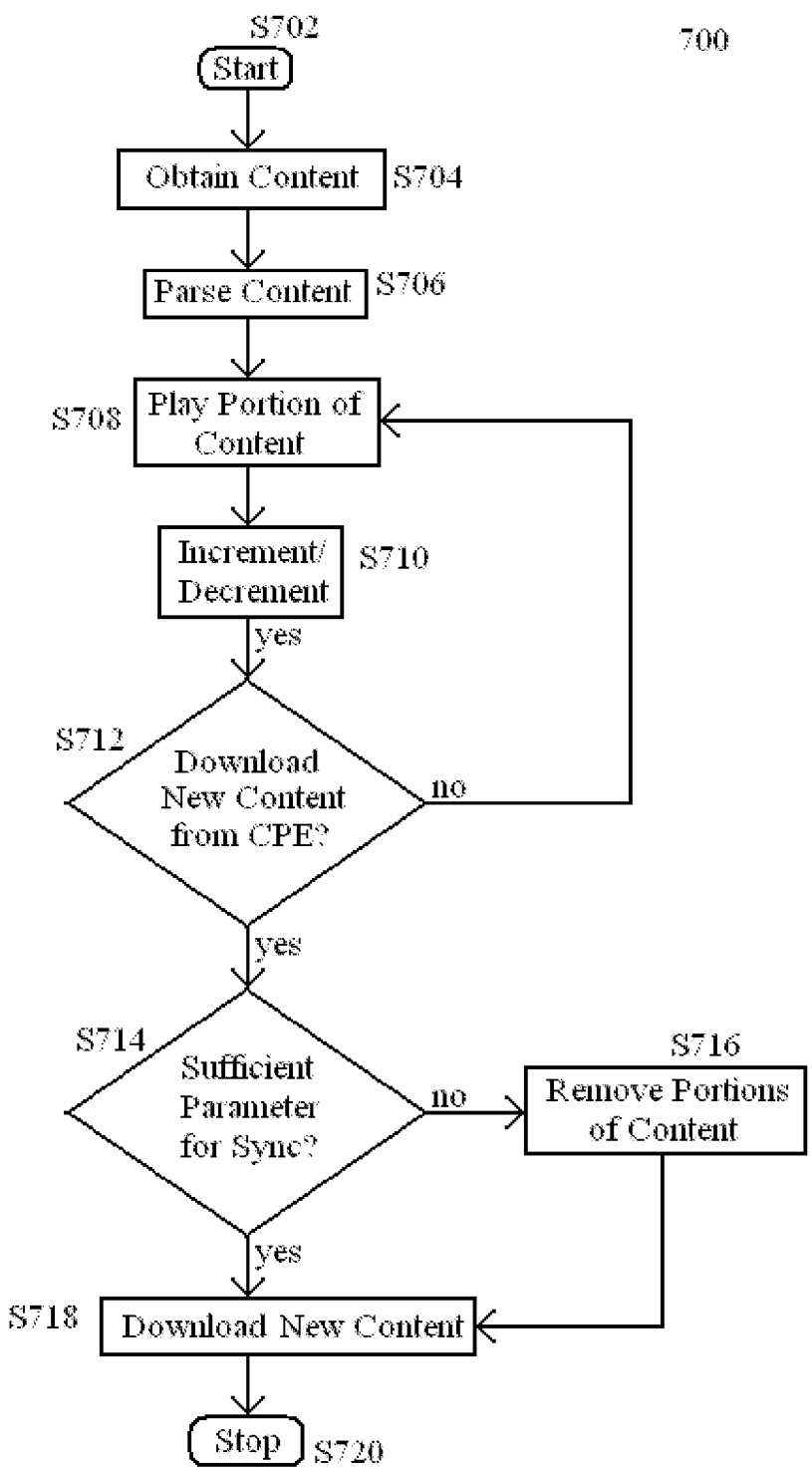
FIG. 7 illustrates an example method for a PMP to synchronize with a CPE in accordance with an aspect of the present invention.

FIG. 7 illustrates an example method 700 for PMP 206 to develop user preferences and download new content from CPE 204 in accordance with an aspect of the present invention.

Method 700 starts (S702) and PMP 204 obtains media content from CPE 204 (S704). In one embodiment, processing portion 404 instructs communication portion 402 to request content from CPE 204 by way of signal 416. CPE 204 then provides the requested content by way of signal 414. In the event the provided content is encrypted, security portion 408 decrypts the content in accordance with the IP rights associated with the content as provided by service provider. The decrypted content is then provided to parsing portion 410.

The media content is then parsed into separate components, in a manner similar to that described above with reference to step S506 of method 500 (S706). For purposes of discussion, presume that PMP 206 downloads movie content corresponding to a movie titled "MOVIE." Further, for purposes of discussion, suppose MOVIE content includes a main video component, a main audio component, a Spanish audio component, a subtitle component, scene description metadata, a targeted video 1 component, a targeted audio 1 component, a camera close up video 1 component and a camera close up video 2 component, for example as discussed above with reference to Table 1. At this point, processing portion 404 instructs parsing portion 410 to separate MOVIE content into its components.

A user may then play portions of content on PMP 206 (S708). As mentioned above, a user may access components of MOVIE content for playback, for example on a TV (not shown).

The portions of the content are then incremented and/or decremented in a manner similar to step S510 discussed above with reference to method 500 (S710). In one embodiment, counting portion 412 increments counters associated with the portions of the content that are played and decrements the counters associated with the portions of the content that are not played. In another embodiment, counting portion 412 increments counters associated with the portions of the content that are played and does not change the counters associated with the portions of the content that are not played.

In another embodiment of the present invention, PMP 206 may periodically transmit the counters associated with MOVIE in memory 406 of PMP 206 to CPE 204. CPE 204 may use the transmitted counters to learn preferences of PMP 206 and accordingly make determinations of which portions of content should be transmitted during future media downloads to PMP 206. This allows PMP 206 and CPE 204 to independently make decisions for memory management.

It is then determined whether additional content is to be synchronized onto PMP 206 from CPE 204 (S712). For example, the user may want to copy second content.

If a user is not currently trying to acquire additional content, then the person may be able to continue to play portions of the content currently on PMP 206 (S708).

If a user is attempting to acquire additional content, it is then determined whether there are sufficient parameters for content transfer (S714). Non-limiting examples of synchronization parameters include time required for synchronization and memory available on PMP 206. For example, for purposes of discussion, presume that user want to synchronize, from CPE 204 onto PMP 206, another movie content corresponding to a movie titled "SECOND MOVIE." Further, for purposes of discussion, suppose SECOND MOVIE content includes a main video component, a main audio component, a Spanish audio component, a subtitle component, scene description metadata, a targeted video 1 component, a targeted audio 1 component, a camera close up video 1 component and a camera close up video 2 component, for example as discussed above with reference to Table 1. In this example, presume that PMP 206 indicates that synchronizing all the components of SECOND MOVIE will take 15 minutes and will require 12 gigabytes of storage within PMP 206. At that point, the user may determine that 15 minutes is too long a wait. Similarly, PMP 206 may provide an indication to user that memory portion 406 does not have 12 gigabytes of free storage with which it may download all the components of SECOND MOVIE.

If the parameters for synchronization are met, PMP 206 downloads the content from CPE 204 (S718). For example, suppose that PMP 206 indicates that synchronizing all the components of SECOND MOVIE will take 15 minutes and will require 12 gigabytes of storage within PMP 206. Further, suppose that the user does not mind waiting 15 minutes and that memory portion 406 of PMP 206 has 12 gigabytes of free storage with which it may download all of the components of SECOND MOVIE. In such a case, in one embodiment, processing portion 404 instructs communication portion 402 to request content from CPE 204 by way of signal 416. CPE 204 then provides the requested MOVIE content by way of signal 414. In the event the provided content is encrypted, security portion 408 decrypts the content in accordance with the IP rights associated with the content as provided by service provider. The decrypted content is then provided to parsing portion 410. At this point, processing portion 404 instructs parsing portion 410 to separate MOVIE content into its components.

The main advantage of this process of memory management on PMP 206 is efficient storage management of PMP 206, without user intervention. With the example methods described above, PMP 206 is capable of managing memory when transferring media content from CPE 204 to PMP 206 without prompting the user for more input even if there is not enough available memory of PMP 206.

If the parameters for synchronization are not met, components of the content to be transferred are not transferred during synchronization (S716). In an example embodiment, the counters associated with different components of MOVIE content are checked and the components that have the lowest count are used to mark the components of SECOND MOVIE not to transfer from CPE 204 to PMP 206. If not enough memory has been freed, the components of SECOND MOVIE with the next lowest counts are marked not to be transferred. The process of marking the components of content with the lowest counts is repeated until the parameters for synchronization are met.

In another example embodiment, the counters associated with different components of MOVIE content are checked and only the components that have the highest count are used to mark the components of SECOND MOVIE to transfer from CPE 204 to PMP 206.

Then, PMP 206 downloads the content from CPE 204 (S718) and the process finishes (S720). In this example, the SECOND MOVIE content will be downloaded into PMP 206.

The foregoing description of various preferred embodiments of the invention have been presented for purposes of illustration and description. It is not intended to be exhaustive or to limit the invention to the precise forms disclosed, and obviously many modifications and variations are possible in light of the above teaching. The example embodiments, as described above, were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

The invention claimed is:

1. A method for synchronizing media content, the method comprising:
   receiving a first media content item;
   parsing, using a hardware processor, the first media content item into a first plurality of content components;
   associating a counter with each of the first plurality of content components;
   receiving a second media content item;
   parsing the second media content item into a second plurality of content components;
   receiving a request to transfer the second media content item to a media device;
   determining values of each of the counters associated with the first plurality of content components;
   determining a subset of the second plurality of content components to be transferred to the media device based on the values of each of the counters associated with the first plurality of content components; and
   transmitting the subset of the second plurality of content components to the media device.

2. The method of claim 1, further comprising inhibiting one or more of the second plurality of content components other than content components included in the subset of the second plurality of content components from being transmitted to the media device.

3. The method of claim 1, wherein the first plurality of content components and the second plurality of content components include a video component, an audio component, and a subtitle component.

4. The method of claim 3, wherein the audio component comprises a first audio component in a first language and a second audio component in a second language.

5. The method of claim 3, wherein the subtitle component comprises a first subtitle component in a first language and a second subtitle component in a second language.

6. The method of claim 1, further comprising:
determining that at least one content component of the first plurality of content components is being played back;
incrementing a value of the counter associated with the at least one content component; and
decrementing values of the counters associated with the first plurality of content components that are not being played back, wherein the values of each of the counters associated with the first plurality of content components are determined based on the incremented values and the decremented values.

7. The method of claim 1, further comprising:
determining that at least one content component of the first plurality of content components is being played back; and
incrementing a value of the counter associated with the at least one content component, wherein the values of each of the counters associated with the first plurality of content components are determined based on the incremented values.

8. The method of claim 1, further comprising comparing the determined values of the plurality of the counters associated with the first plurality of content components to a synchronization parameter, wherein the subset of the second plurality of content components is determined based on the comparison.

9. The method of claim 8, further comprising removing at least one of the content components from inclusion in the subset of the second plurality of content components based on the comparison.

10. The method of claim 1, further comprising ranking the counters associated with the first plurality of content components based on the associated values, wherein the subset of the second plurality of content components is determined based on the ranking.

11. A method for synchronizing media content, the method comprising:
receiving a media content item;
parsing, using a hardware processor, the media content item into a plurality of content components;
associating counters with each of the plurality of content components, wherein a value of a counter associated with a content component is incremented in response to the content component being played back;
determining whether a media device meets a synchronization parameter in response to receiving a request to transfer the media content item to the media device, wherein the media device is associated with a device containing the hardware processor over a communications network;
removing, based on the associated counters, at least one content component from the plurality of content components for transmission to the media device in response to determining that the synchronization parameter is not met, wherein the value of the counter associated with the at least one content component does not meet a threshold value;
repeating the removing until the synchronization parameter is met; and
transmitting a subset of the plurality of content components to the media device in response to determining that the synchronization parameter is met.

12. The method of claim 11, further comprising ranking the counters associated with the plurality of content components based on the associated values, wherein the at least one content component is removed in response to having the lowest ranking of the ranked counters.

13. A system for synchronizing media content, the system comprising:
a hardware processor that is configured to:
receive a first media content item;
parse the first media content item into a first plurality of content components;
associate a counter with each of the first plurality of content components;
receive a second media content item;
parse the second media content item into a second plurality of content components;
receive a request to transfer the second media content item to a media device;
determine values of each of the counters associated with the first plurality of content components;
determine a subset of the second plurality of content components to be transferred to the media device based on the values of each of the counters associated with the first plurality of content components; and
transmit the subset of the second plurality of content components to the media device.

14. The system of claim 13, wherein the hardware processor is further configured to inhibit one or more of the second plurality of content components other than content components included in the subset of the second plurality of content components from being transmitted to the media device.

15. The system of claim 13, wherein the first plurality of content components and the second plurality of content components include a video component, an audio component, and a subtitle component.

16. The system of claim 15, wherein the audio component comprises a first audio component in a first language and a second audio component in a second language.

17. The system of claim 15, wherein the subtitle component comprises a first subtitle component in a first language and a second subtitle component in a second language.

18. The system of claim 13, wherein the hardware processor is further configured to:
determine that at least one content component of the first plurality of content components is being played back;
increment a value of the counter associated with the at least one content component; and
decrement values of the counters associated with the first plurality of content components that are not being played back, wherein the values of each of the counters associated with the first plurality of content components are determined based on the incremented values and the decremented values.

19. The system of claim 13, wherein the hardware processor is further configured to:
determine that at least one content component of the first plurality of content components is being played back; and increment a value of the counter associated with the at least one content component, wherein the values of each of the counters associated with the first plurality of content components are determined based on the incremented values.

20. The system of claim 13, wherein the hardware processor is further configured to compare the determined values of the plurality of the counters associated with the first plurality of content components to a synchronization parameter, wherein the subset of the second plurality of content components is determined based on the comparison.

21. The system of claim 20, wherein the hardware processor is further configured to remove at least one of the content components from inclusion in the subset of the second plurality of content components based on the comparison.

22. The system of claim 13, wherein the hardware processor is further configured to rank the counters associated with the first plurality of content components based on the associated values, wherein the subset of the second plurality of content components is determined based on the ranking.

23. A system for synchronizing media content, the system comprising:
a hardware processor that is configured to:
receive a media content item;
parse the media content item into a plurality of content components;
associate counters with each of the plurality of content components, wherein a value of a counter associated with a content component is incremented in response to the content component being played back;
determine whether a media device meets a synchronization parameter in response to receiving a request to transfer the media content item to the media device, wherein the media device is associated with a device containing the hardware processor over a communications network;
remove, based on the associated counters, at least one content component from the plurality of content components for transmission to the media device in response to determining that the synchronization parameter is not met, wherein the value of the counter associated with the at least one content component does not meet a threshold value;
repeat the removing until the synchronization parameter is met; and
transmit a subset of the plurality of content components to the media device in response to determining that the synchronization parameter is met.

24. The system of claim 23, wherein the hardware processor is further configured to rank the counters associated with the plurality of content components based on the associated values, wherein the at least one content component is removed in response to having the lowest ranking of the ranked counters.

* * * * *